United States Patent [19]
Abramson

[11] Patent Number: 5,174,758
[45] Date of Patent: Dec. 29, 1992

[54] COLOR SELECTOR FOR FOUR-COLOR OFFSET PRINTING, AND METHOD OF CREATING IT

[76] Inventor: Steven J. Abramson, 50 E. 72nd St., Apt. 15B, New York, N.Y. 10021

[21] Appl. No.: 625,876

[22] Filed: Dec. 11, 1990

[51] Int. Cl.⁵ .......................................... G09B 19/00
[52] U.S. Cl. ..................................... 434/98; 434/104
[58] Field of Search ............... 356/421, 422, 423, 243; 434/98, 101, 104

[56] References Cited

U.S. PATENT DOCUMENTS

| | | | |
|---|---|---|---|
| 173,408 | 2/1876 | Leggett | 434/98 |
| 4,104,809 | 8/1978 | Day et al. | 434/104 |
| 4,629,428 | 12/1986 | Phillips | 434/98 |
| 4,717,954 | 1/1988 | Fujita et al. | 356/421 X |
| 4,878,977 | 11/1989 | Kueppers | 434/98 X |
| 4,966,461 | 10/1990 | Hopper | 356/423 X |

Primary Examiner—Richard J. Apley
Assistant Examiner—D. F. Crosby
Attorney, Agent, or Firm—Alan H. Levine

[57] ABSTRACT

A color swatch arrangement for use in selecting colors for four-color offset printing, and a method for creating such an arrangement, involves dividing the visible spectrum into a plurality of distinct hues, and determining the proportions of yellow, red, and blue dot densities needed to create color swatches of each distinct hue. A series of lighter-and-lighter tint swatches associated with each distinct hue are created by reducing each of the yellow, red, and blue dot densities in steps. A series of darker shade swatches is created by adding a proportion of black dot density to each distinct hue and all the stepped lighter tints created from it, and a series of darker-and-darker shade swatches are produced by adding greater proportions of black dot density in stages to all the stepped lighter tints.

16 Claims, 8 Drawing Sheets

FIG. 2A

TRUMATCH
25-a

| | | | | | | | |
|---|---|---|---|---|---|---|---|
| 25-a | Y | 27 | M | 12 | C 89 | K | 0 |
| 25-b | Y | 23 | M | 10 | C 76 | K | 0 |
| 25-c | Y | 19 | M | 8 | C 62 | K | 0 |
| 25-d | Y | 15 | M | 7 | C 49 | K | 0 |
| 25-e | Y | 11 | M | 5 | C 36 | K | 0 |
| 25-f | Y | 7 | M | 3 | C 22 | K | 0 |
| 25-g | Y | 3 | M | 1 | C 9 | K | 0 |
| 25-a1 | Y | 27 | M | 12 | C 84 | K | 6 |
| 25-b1 | Y | 23 | M | 10 | C 76 | K | 6 |
| 25-c1 | Y | 19 | M | 8 | C 62 | K | 6 |
| 25-d1 | Y | 15 | M | 7 | C 49 | K | 6 |
| 25-e1 | Y | 11 | M | 5 | C 36 | K | 6 |
| 25-f1 | Y | 7 | M | 3 | C 22 | K | 6 |
| 25-g1 | Y | 3 | M | 1 | C 9 | K | 6 |
| 25-a2 | Y | 27 | M | 12 | C 89 | K | 12 |
| 25-b2 | Y | 23 | M | 10 | C 76 | K | 12 |
| 25-c2 | Y | 19 | M | 8 | C 62 | K | 12 |
| 25-d2 | Y | 15 | M | 7 | C 49 | K | 12 |
| 25-e2 | Y | 11 | M | 5 | C 36 | K | 12 |
| 25-f2 | Y | 7 | M | 3 | C 22 | K | 12 |
| 25-g2 | Y | 3 | M | 1 | C 9 | K | 12 |
| 25-a3 | Y | 27 | M | 12 | C 89 | K | 18 |
| 25-b3 | Y | 23 | M | 10 | C 76 | K | 18 |
| 25-c3 | Y | 19 | M | 8 | C 62 | K | 18 |
| 25-d3 | Y | 15 | M | 7 | C 49 | K | 18 |
| 25-e3 | Y | 11 | M | 5 | C 36 | K | 18 |
| 25-f3 | Y | 7 | M | 3 | C 22 | K | 18 |
| 25-g3 | Y | 3 | M | 1 | C 9 | K | 18 |
| 25-a4 | Y | 27 | M | 12 | C 89 | K | 24 |
| 25-b4 | Y | 23 | M | 10 | C 76 | K | 24 |
| 25-c4 | Y | 19 | M | 8 | C 62 | K | 24 |
| 25-d4 | Y | 15 | M | 7 | C 49 | K | 24 |
| 25-e4 | Y | 11 | M | 5 | C 36 | K | 24 |
| 25-f4 | Y | 7 | M | 3 | C 22 | K | 24 |
| 25-g4 | Y | 3 | M | 1 | C 9 | K | 24 |
| 25-a5 | Y | 27 | M | 12 | C 89 | K | 30 |
| 25-b5 | Y | 23 | M | 10 | C 76 | K | 30 |
| 25-c5 | Y | 19 | M | 8 | C 62 | K | 30 |
| 25-d5 | Y | 15 | M | 7 | C 49 | K | 30 |
| 25-e5 | Y | 11 | M | 5 | C 36 | K | 30 |
| 25-f5 | Y | 7 | M | 3 | C 22 | K | 30 |
| 25-g5 | Y | 3 | M | 1 | C 9 | K | 30 |
| 25-a6 | Y | 27 | M | 12 | C 89 | K | 36 |
| 25-b6 | Y | 23 | M | 10 | C 76 | K | 36 |
| 25-c6 | Y | 19 | M | 8 | C 62 | K | 36 |
| 25-d6 | Y | 15 | M | 7 | C 49 | K | 36 |
| 25-e6 | Y | 11 | M | 5 | C 36 | K | 36 |
| 25-f6 | Y | 7 | M | 3 | C 22 | K | 36 |
| 25-g6 | Y | 3 | M | 1 | C 9 | K | 36 |
| 25-a7 | Y | 27 | M | 12 | C 89 | K | 42 |
| 25-b7 | Y | 23 | M | 10 | C 76 | K | 42 |
| 25-c7 | Y | 19 | M | 8 | C 62 | K | 42 |
| 25-d7 | Y | 15 | M | 7 | C 49 | K | 42 |
| 25-e7 | Y | 11 | M | 5 | C 36 | K | 42 |
| 25-f7 | Y | 7 | M | 3 | C 22 | K | 42 |
| 25-g7 | Y | 3 | M | 1 | C 9 | K | 42 |

FIG. 3

TRUMATCH
1-a

| | | | | | | | |
|---|---|---|---|---|---|---|---|
| 1-a | Y | 40 | M | 90 | C 0 | K | 0 |
| 1-b | Y | 34 | M | 77 | C 0 | K | 0 |
| 1-c | Y | 28 | M | 63 | C 0 | K | 0 |
| 1-d | Y | 22 | M | 50 | C 0 | K | 0 |
| 1-e | Y | 16 | M | 36 | C 0 | K | 0 |
| 1-f | Y | 10 | M | 23 | C 0 | K | 0 |
| 1-g | Y | 4 | M | 9 | C 0 | K | 0 |
| 1-h | Y | 2 | M | 5 | C 0 | K | 0 |
| 1-a1 | Y | 40 | M | 90 | C 0 | K | 6 |
| 1-b1 | Y | 34 | M | 77 | C 0 | K | 6 |
| 1-c1 | Y | 28 | M | 63 | C 0 | K | 6 |
| 1-d1 | Y | 22 | M | 50 | C 0 | K | 6 |
| 1-e1 | Y | 16 | M | 36 | C 0 | K | 6 |
| 1-f1 | Y | 10 | M | 23 | C 0 | K | 6 |
| 1-g1 | Y | 4 | M | 9 | C 0 | K | 6 |
| 1-h1 | Y | 2 | M | 5 | C 0 | K | 6 |
| 1-a2 | Y | 40 | M | 90 | C 0 | K | 12 |
| 1-b2 | Y | 34 | M | 77 | C 0 | K | 12 |
| 1-c2 | Y | 28 | M | 63 | C 0 | K | 12 |
| 1-d2 | Y | 22 | M | 50 | C 0 | K | 12 |
| 1-e2 | Y | 16 | M | 36 | C 0 | K | 12 |
| 1-f2 | Y | 10 | M | 23 | C 0 | K | 12 |
| 1-g2 | Y | 4 | M | 9 | C 0 | K | 12 |
| 1-h2 | Y | 2 | M | 5 | C 0 | K | 12 |
| 1-a3 | Y | 40 | M | 90 | C 0 | K | 18 |
| 1-b3 | Y | 34 | M | 77 | C 0 | K | 18 |
| 1-c3 | Y | 28 | M | 63 | C 0 | K | 18 |
| 1-d3 | Y | 22 | M | 50 | C 0 | K | 18 |
| 1-e3 | Y | 16 | M | 36 | C 0 | K | 18 |
| 1-f3 | Y | 10 | M | 23 | C 0 | K | 18 |
| 1-g3 | Y | 4 | M | 9 | C 0 | K | 18 |
| 1-h3 | Y | 2 | M | 5 | C 0 | K | 18 |
| 1-a4 | Y | 40 | M | 90 | C 0 | K | 24 |
| 1-b4 | Y | 34 | M | 77 | C 0 | K | 24 |
| 1-c4 | Y | 28 | M | 63 | C 0 | K | 24 |
| 1-d4 | Y | 22 | M | 50 | C 0 | K | 24 |
| 1-e4 | Y | 16 | M | 36 | C 0 | K | 24 |
| 1-f4 | Y | 10 | M | 23 | C 0 | K | 24 |
| 1-g4 | Y | 4 | M | 9 | C 0 | K | 24 |
| 1-h4 | Y | 2 | M | 5 | C 0 | K | 24 |
| 1-a5 | Y | 40 | M | 90 | C 0 | K | 30 |
| 1-b5 | Y | 34 | M | 77 | C 0 | K | 30 |
| 1-c5 | Y | 28 | M | 63 | C 0 | K | 30 |
| 1-d5 | Y | 22 | M | 50 | C 0 | K | 30 |
| 1-e5 | Y | 16 | M | 36 | C 0 | K | 30 |
| 1-f5 | Y | 10 | M | 23 | C 0 | K | 30 |
| 1-g5 | Y | 4 | M | 9 | C 0 | K | 30 |
| 1-h5 | Y | 2 | M | 5 | C 0 | K | 30 |
| 1-a6 | Y | 40 | M | 90 | C 0 | K | 36 |
| 1-b6 | Y | 34 | M | 77 | C 0 | K | 36 |
| 1-c6 | Y | 28 | M | 63 | C 0 | K | 36 |
| 1-d6 | Y | 22 | M | 50 | C 0 | K | 36 |
| 1-e6 | Y | 16 | M | 36 | C 0 | K | 36 |
| 1-f6 | Y | 10 | M | 23 | C 0 | K | 36 |
| 1-g6 | Y | 4 | M | 9 | C 0 | K | 36 |
| 1-h6 | Y | 2 | M | 5 | C 0 | K | 36 |
| 1-a7 | Y | 40 | M | 90 | C 0 | K | 42 |
| 1-b7 | Y | 34 | M | 77 | C 0 | K | 42 |
| 1-c7 | Y | 28 | M | 63 | C 0 | K | 42 |
| 1-d7 | Y | 22 | M | 50 | C 0 | K | 42 |
| 1-e7 | Y | 16 | M | 36 | C 0 | K | 42 |
| 1-f7 | Y | 10 | M | 23 | C 0 | K | 42 |
| 1-g7 | Y | 4 | M | 9 | C 0 | K | 42 |
| 1-h7 | Y | 2 | M | 5 | C 0 | K | 42 |

FIG. 4A

TRUMATCH
2-a

| | | | | | | | |
|---|---|---|---|---|---|---|---|
| 2-a | Y | 60 | M | 100 | C 0 | K | 0 |
| 2-b | Y | 51 | M | 85 | C 0 | K | 0 |
| 2-c | Y | 42 | M | 70 | C 0 | K | 0 |
| 2-d | Y | 33 | M | 55 | C 0 | K | 0 |
| 2-e | Y | 24 | M | 40 | C 0 | K | 0 |
| 2-f | Y | 15 | M | 25 | C 0 | K | 0 |
| 2-g | Y | 6 | M | 10 | C 0 | K | 0 |
| 2-h | Y | 3 | M | 5 | C 0 | K | 0 |
| 2-a1 | Y | 60 | M | 100 | C 0 | K | 6 |
| 2-b1 | Y | 51 | M | 85 | C 0 | K | 6 |
| 2-c1 | Y | 42 | M | 70 | C 0 | K | 6 |
| 2-d1 | Y | 33 | M | 55 | C 0 | K | 6 |
| 2-e1 | Y | 24 | M | 40 | C 0 | K | 6 |
| 2-f1 | Y | 15 | M | 25 | C 0 | K | 6 |
| 2-g1 | Y | 6 | M | 10 | C 0 | K | 6 |
| 2-h1 | Y | 3 | M | 5 | C 0 | K | 6 |
| 2-a2 | Y | 60 | M | 100 | C 0 | K | 12 |
| 2-b2 | Y | 51 | M | 85 | C 0 | K | 12 |
| 2-c2 | Y | 42 | M | 70 | C 0 | K | 12 |
| 2-d2 | Y | 33 | M | 55 | C 0 | K | 12 |
| 2-e2 | Y | 24 | M | 40 | C 0 | K | 12 |
| 2-f2 | Y | 15 | M | 25 | C 0 | K | 12 |
| 2-g2 | Y | 6 | M | 10 | C 0 | K | 12 |
| 2-h2 | Y | 3 | M | 5 | C 0 | K | 12 |
| 2-a3 | Y | 60 | M | 100 | C 0 | K | 18 |
| 2-b3 | Y | 51 | M | 85 | C 0 | K | 18 |
| 2-c3 | Y | 42 | M | 70 | C 0 | K | 18 |
| 2-d3 | Y | 33 | M | 55 | C 0 | K | 18 |
| 2-e3 | Y | 24 | M | 40 | C 0 | K | 18 |
| 2-f3 | Y | 15 | M | 25 | C 0 | K | 18 |
| 2-g3 | Y | 6 | M | 10 | C 0 | K | 18 |
| 2-h3 | Y | 3 | M | 5 | C 0 | K | 18 |
| 2-a4 | Y | 60 | M | 100 | C 0 | K | 24 |
| 2-b4 | Y | 51 | M | 85 | C 0 | K | 24 |
| 2-c4 | Y | 42 | M | 70 | C 0 | K | 24 |
| 2-d4 | Y | 33 | M | 55 | C 0 | K | 24 |
| 2-e4 | Y | 24 | M | 40 | C 0 | K | 24 |
| 2-f4 | Y | 15 | M | 25 | C 0 | K | 24 |
| 2-g4 | Y | 6 | M | 10 | C 0 | K | 24 |
| 2-h4 | Y | 3 | M | 5 | C 0 | K | 24 |
| 2-a5 | Y | 60 | M | 100 | C 0 | K | 30 |
| 2-b5 | Y | 51 | M | 85 | C 0 | K | 30 |
| 2-c5 | Y | 42 | M | 70 | C 0 | K | 30 |
| 2-d5 | Y | 33 | M | 55 | C 0 | K | 30 |
| 2-e5 | Y | 24 | M | 40 | C 0 | K | 30 |
| 2-f5 | Y | 15 | M | 25 | C 0 | K | 30 |
| 2-g5 | Y | 6 | M | 10 | C 0 | K | 30 |
| 2-h5 | Y | 3 | M | 5 | C 0 | K | 30 |
| 2-a6 | Y | 60 | M | 100 | C 0 | K | 36 |
| 2-b6 | Y | 51 | M | 85 | C 0 | K | 36 |
| 2-c6 | Y | 42 | M | 70 | C 0 | K | 36 |
| 2-d6 | Y | 33 | M | 55 | C 0 | K | 36 |
| 2-e6 | Y | 24 | M | 40 | C 0 | K | 36 |
| 2-f6 | Y | 15 | M | 25 | C 0 | K | 36 |
| 2-g6 | Y | 6 | M | 10 | C 0 | K | 36 |
| 2-h6 | Y | 3 | M | 5 | C 0 | K | 36 |
| 2-a7 | Y | 60 | M | 100 | C 0 | K | 42 |
| 2-b7 | Y | 51 | M | 85 | C 0 | K | 42 |
| 2-c7 | Y | 42 | M | 70 | C 0 | K | 42 |
| 2-d7 | Y | 33 | M | 55 | C 0 | K | 42 |
| 2-e7 | Y | 24 | M | 40 | C 0 | K | 42 |
| 2-f7 | Y | 15 | M | 25 | C 0 | K | 42 |
| 2-g7 | Y | 6 | M | 10 | C 0 | K | 42 |
| 2-h7 | Y | 3 | M | 5 | C 0 | K | 42 |

FIG. 4B

TRUMATCH
3-a

| | | | | | | |
|---|---|---|---|---|---|---|
| 3-a | Y 51 | M 87 | C 0 | K 0 |
| 3-b | Y 43 | M 74 | C 0 | K 0 |
| 3-c | Y 36 | M 61 | C 0 | K 0 |
| 3-d | Y 28 | M 48 | C 0 | K 0 |
| 3-e | Y 20 | M 35 | C 0 | K 0 |
| 3-f | Y 13 | M 22 | C 0 | K 0 |
| 3-g | Y 5 | M 9 | C 0 | K 0 |
| 3-h | Y 3 | M 4 | C 0 | K 0 |
| 3-a1 | Y 51 | M 87 | C 0 | K 6 |
| 3-b1 | Y 43 | M 74 | C 0 | K 6 |
| 3-c1 | Y 36 | M 61 | C 0 | K 6 |
| 3-d1 | Y 28 | M 48 | C 0 | K 6 |
| 3-e1 | Y 20 | M 35 | C 0 | K 6 |
| 3-f1 | Y 13 | M 22 | C 0 | K 6 |
| 3-g1 | Y 5 | M 9 | C 0 | K 6 |
| 3-h1 | Y 3 | M 4 | C 0 | K 6 |
| 3-a2 | Y 51 | M 87 | C 0 | K 12 |
| 3-b2 | Y 43 | M 74 | C 0 | K 12 |
| 3-c2 | Y 36 | M 61 | C 0 | K 12 |
| 3-d2 | Y 28 | M 48 | C 0 | K 12 |
| 3-e2 | Y 20 | M 35 | C 0 | K 12 |
| 3-f2 | Y 13 | M 22 | C 0 | K 12 |
| 3-g2 | Y 5 | M 9 | C 0 | K 12 |
| 3-h2 | Y 3 | M 4 | C 0 | K 12 |
| 3-a3 | Y 51 | M 87 | C 0 | K 18 |
| 3-b3 | Y 43 | M 74 | C 0 | K 18 |
| 3-c3 | Y 36 | M 61 | C 0 | K 18 |
| 3-d3 | Y 28 | M 48 | C 0 | K 18 |
| 3-e3 | Y 20 | M 35 | C 0 | K 18 |
| 3-f3 | Y 13 | M 22 | C 0 | K 18 |
| 3-g3 | Y 5 | M 9 | C 0 | K 18 |
| 3-h3 | Y 3 | M 4 | C 0 | K 18 |
| 3-a4 | Y 51 | M 87 | C 0 | K 24 |
| 3-b4 | Y 43 | M 74 | C 0 | K 24 |
| 3-c4 | Y 36 | M 61 | C 0 | K 24 |
| 3-d4 | Y 28 | M 48 | C 0 | K 24 |
| 3-e4 | Y 20 | M 35 | C 0 | K 24 |
| 3-f4 | Y 13 | M 22 | C 0 | K 24 |
| 3-g4 | Y 5 | M 9 | C 0 | K 24 |
| 3-h4 | Y 3 | M 4 | C 0 | K 24 |
| 3-a5 | Y 51 | M 87 | C 0 | K 30 |
| 3-b5 | Y 43 | M 74 | C 0 | K 30 |
| 3-c5 | Y 36 | M 61 | C 0 | K 30 |
| 3-d5 | Y 28 | M 48 | C 0 | K 30 |
| 3-e5 | Y 20 | M 35 | C 0 | K 30 |
| 3-f5 | Y 13 | M 22 | C 0 | K 30 |
| 3-g5 | Y 5 | M 9 | C 0 | K 30 |
| 3-h5 | Y 3 | M 4 | C 0 | K 30 |
| 3-a6 | Y 51 | M 87 | C 0 | K 36 |
| 3-b6 | Y 43 | M 74 | C 0 | K 36 |
| 3-c6 | Y 36 | M 61 | C 0 | K 36 |
| 3-d6 | Y 28 | M 48 | C 0 | K 36 |
| 3-e6 | Y 20 | M 35 | C 0 | K 36 |
| 3-f6 | Y 13 | M 22 | C 0 | K 36 |
| 3-g6 | Y 5 | M 9 | C 0 | K 36 |
| 3-h6 | Y 3 | M 4 | C 0 | K 36 |
| 3-a7 | Y 51 | M 87 | C 0 | K 42 |
| 3-b7 | Y 43 | M 74 | C 0 | K 42 |
| 3-c7 | Y 36 | M 61 | C 0 | K 42 |
| 3-d7 | Y 28 | M 48 | C 0 | K 42 |
| 3-e7 | Y 20 | M 35 | C 0 | K 42 |
| 3-f7 | Y 13 | M 22 | C 0 | K 42 |
| 3-g7 | Y 5 | M 9 | C 0 | K 42 |
| 3-h7 | Y 3 | M 4 | C 0 | K 42 |

FIG. 4C

TRUMATCH
4-a

| | | | | | | |
|---|---|---|---|---|---|---|
| 4-a | Y100 | M100 | C 10 | K 0 |
| 4-b | Y 85 | M 85 | C 9 | K 0 |
| 4-c | Y 70 | M 70 | C 7 | K 0 |
| 4-d | Y 55 | M 55 | C 6 | K 0 |
| 4-e | Y 40 | M 40 | C 4 | K 0 |
| 4-f | Y 25 | M 25 | C 3 | K 0 |
| 4-g | Y 10 | M 10 | C 1 | K 0 |
| 4-a1 | Y100 | M100 | C 10 | K 6 |
| 4-b1 | Y 85 | M 85 | C 9 | K 6 |
| 4-c1 | Y 70 | M 70 | C 7 | K 6 |
| 4-d1 | Y 55 | M 55 | C 6 | K 6 |
| 4-e1 | Y 40 | M 40 | C 4 | K 6 |
| 4-f1 | Y 25 | M 25 | C 3 | K 6 |
| 4-g1 | Y 10 | M 10 | C 1 | K 6 |
| 4-a2 | Y100 | M100 | C 10 | K 12 |
| 4-b2 | Y 85 | M 85 | C 9 | K 12 |
| 4-c2 | Y 70 | M 70 | C 7 | K 12 |
| 4-d2 | Y 55 | M 55 | C 6 | K 12 |
| 4-e2 | Y 40 | M 40 | C 4 | K 12 |
| 4-f2 | Y 25 | M 25 | C 3 | K 12 |
| 4-g2 | Y 10 | M 10 | C 1 | K 12 |
| 4-a3 | Y100 | M100 | C 10 | K 18 |
| 4-b3 | Y 85 | M 85 | C 9 | K 18 |
| 4-c3 | Y 70 | M 70 | C 7 | K 18 |
| 4-d3 | Y 55 | M 55 | C 6 | K 18 |
| 4-e3 | Y 40 | M 40 | C 4 | K 18 |
| 4-f3 | Y 25 | M 25 | C 3 | K 18 |
| 4-g3 | Y 10 | M 10 | C 1 | K 18 |
| 4-a4 | Y100 | M100 | C 10 | K 24 |
| 4-b4 | Y 85 | M 85 | C 9 | K 24 |
| 4-c4 | Y 70 | M 70 | C 7 | K 24 |
| 4-d4 | Y 55 | M 55 | C 6 | K 24 |
| 4-e4 | Y 40 | M 40 | C 4 | K 24 |
| 4-f4 | Y 25 | M 25 | C 3 | K 24 |
| 4-g4 | Y 10 | M 10 | C 1 | K 24 |
| 4-a5 | Y100 | M100 | C 10 | K 30 |
| 4-b5 | Y 85 | M 85 | C 9 | K 30 |
| 4-c5 | Y 70 | M 70 | C 7 | K 30 |
| 4-d5 | Y 55 | M 55 | C 6 | K 30 |
| 4-e5 | Y 40 | M 40 | C 4 | K 30 |
| 4-f5 | Y 25 | M 25 | C 3 | K 30 |
| 4-g5 | Y 10 | M 10 | C 1 | K 30 |
| 4-a6 | Y100 | M100 | C 10 | K 36 |
| 4-b6 | Y 85 | M 85 | C 9 | K 36 |
| 4-c6 | Y 70 | M 70 | C 7 | K 36 |
| 4-d6 | Y 55 | M 55 | C 6 | K 36 |
| 4-e6 | Y 40 | M 40 | C 4 | K 36 |
| 4-f6 | Y 25 | M 25 | C 3 | K 36 |
| 4-g6 | Y 10 | M 10 | C 1 | K 36 |
| 4-a7 | Y100 | M100 | C 10 | K 42 |
| 4-b7 | Y 85 | M 85 | C 9 | K 42 |
| 4-c7 | Y 70 | M 70 | C 7 | K 42 |
| 4-d7 | Y 55 | M 55 | C 6 | K 42 |
| 4-e7 | Y 40 | M 40 | C 4 | K 42 |
| 4-f7 | Y 25 | M 25 | C 3 | K 42 |
| 4-g7 | Y 10 | M 10 | C 1 | K 42 |

FIG. 4D

TRUMATCH
5-a

| | | | | | | |
|---|---|---|---|---|---|---|
| 5-a | Y 85 | M100 | C | 0 | K | 0 |
| 5-b | Y 72 | M 85 | C | 0 | K | 0 |
| 5-c | Y 60 | M 70 | C | 0 | K | 0 |
| 5-d | Y 47 | M 55 | C | 0 | K | 0 |
| 5-e | Y 34 | M 40 | C | 0 | K | 0 |
| 5-f | Y 21 | M 25 | C | 0 | K | 0 |
| 5-g | Y 9 | M 10 | C | 0 | K | 0 |
| 5-h | Y 4 | M 5 | C | 0 | K | 0 |
| 5-a1 | Y 85 | M100 | C | 0 | K | 6 |
| 5-b1 | Y 72 | M 85 | C | 0 | K | 6 |
| 5-c1 | Y 60 | M 70 | C | 0 | K | 6 |
| 5-d1 | Y 47 | M 55 | C | 0 | K | 6 |
| 5-e1 | Y 34 | M 40 | C | 0 | K | 6 |
| 5-f1 | Y 21 | M 25 | C | 0 | K | 6 |
| 5-g1 | Y 9 | M 10 | C | 0 | K | 6 |
| 5-h1 | Y 4 | M 5 | C | 0 | K | 6 |
| 5-a2 | Y 85 | M100 | C | 0 | K | 12 |
| 5-b2 | Y 72 | M 85 | C | 0 | K | 12 |
| 5-c2 | Y 60 | M 70 | C | 0 | K | 12 |
| 5-d2 | Y 47 | M 55 | C | 0 | K | 12 |
| 5-e2 | Y 34 | M 40 | C | 0 | K | 12 |
| 5-f2 | Y 21 | M 25 | C | 0 | K | 12 |
| 5-g2 | Y 9 | M 10 | C | 0 | K | 12 |
| 5-h2 | Y 4 | M 5 | C | 0 | K | 12 |
| 5-a3 | Y 85 | M100 | C | 0 | K | 18 |
| 5-b3 | Y 72 | M 85 | C | 0 | K | 18 |
| 5-c3 | Y 60 | M 70 | C | 0 | K | 18 |
| 5-d3 | Y 47 | M 55 | C | 0 | K | 18 |
| 5-e3 | Y 34 | M 40 | C | 0 | K | 18 |
| 5-f3 | Y 21 | M 25 | C | 0 | K | 18 |
| 5-g3 | Y 9 | M 10 | C | 0 | K | 18 |
| 5-h3 | Y 4 | M 5 | C | 0 | K | 18 |
| 5-a4 | Y 85 | M100 | C | 0 | K | 24 |
| 5-b4 | Y 72 | M 85 | C | 0 | K | 24 |
| 5-c4 | Y 60 | M 70 | C | 0 | K | 24 |
| 5-d4 | Y 47 | M 55 | C | 0 | K | 24 |
| 5-e4 | Y 34 | M 40 | C | 0 | K | 24 |
| 5-f4 | Y 21 | M 25 | C | 0 | K | 24 |
| 5-g4 | Y 9 | M 10 | C | 0 | K | 24 |
| 5-h4 | Y 4 | M 5 | C | 0 | K | 24 |
| 5-a5 | Y 85 | M100 | C | 0 | K | 30 |
| 5-b5 | Y 72 | M 85 | C | 0 | K | 30 |
| 5-c5 | Y 60 | M 70 | C | 0 | K | 30 |
| 5-d5 | Y 47 | M 55 | C | 0 | K | 30 |
| 5-e5 | Y 34 | M 40 | C | 0 | K | 30 |
| 5-f5 | Y 21 | M 25 | C | 0 | K | 30 |
| 5-g5 | Y 9 | M 10 | C | 0 | K | 30 |
| 5-h5 | Y 4 | M 5 | C | 0 | K | 30 |
| 5-a6 | Y 85 | M100 | C | 0 | K | 36 |
| 5-b6 | Y 72 | M 85 | C | 0 | K | 36 |
| 5-c6 | Y 60 | M 70 | C | 0 | K | 36 |
| 5-d6 | Y 47 | M 55 | C | 0 | K | 36 |
| 5-e6 | Y 34 | M 40 | C | 0 | K | 36 |
| 5-f6 | Y 21 | M 25 | C | 0 | K | 36 |
| 5-g6 | Y 9 | M 10 | C | 0 | K | 36 |
| 5-h6 | Y 4 | M 5 | C | 0 | K | 36 |
| 5-a7 | Y 85 | M100 | C | 0 | K | 42 |
| 5-b7 | Y 72 | M 85 | C | 0 | K | 42 |
| 5-c7 | Y 60 | M 70 | C | 0 | K | 42 |
| 5-d7 | Y 47 | M 55 | C | 0 | K | 42 |
| 5-e7 | Y 34 | M 40 | C | 0 | K | 42 |
| 5-f7 | Y 21 | M 25 | C | 0 | K | 42 |
| 5-g7 | Y 9 | M 10 | C | 0 | K | 42 |
| 5-h7 | Y 4 | M 5 | C | 0 | K | 42 |

FIG. 4E

TRUMATCH
6-a

| | | | | | | |
|---|---|---|---|---|---|---|
| 6-a | Y100 | M100 | C | 0 | K | 0 |
| 6-b | Y 85 | M 85 | C | 0 | K | 0 |
| 6-c | Y 70 | M 70 | C | 0 | K | 0 |
| 6-d | Y 55 | M 55 | C | 0 | K | 0 |
| 6-e | Y 40 | M 40 | C | 0 | K | 0 |
| 6-f | Y 25 | M 25 | C | 0 | K | 0 |
| 6-g | Y 10 | M 10 | C | 0 | K | 0 |
| 6-h | Y 5 | M 5 | C | 0 | K | 0 |
| 6-a1 | Y100 | M100 | C | 0 | K | 6 |
| 6-b1 | Y 85 | M 85 | C | 0 | K | 6 |
| 6-c1 | Y 70 | M 70 | C | 0 | K | 6 |
| 6-d1 | Y 55 | M 55 | C | 0 | K | 6 |
| 6-e1 | Y 40 | M 40 | C | 0 | K | 6 |
| 6-f1 | Y 25 | M 25 | C | 0 | K | 6 |
| 6-g1 | Y 10 | M 10 | C | 0 | K | 6 |
| 6-h1 | Y 5 | M 5 | C | 0 | K | 6 |
| 6-a2 | Y100 | M100 | C | 0 | K | 12 |
| 6-b2 | Y 85 | M 85 | C | 0 | K | 12 |
| 6-c2 | Y 70 | M 70 | C | 0 | K | 12 |
| 6-d2 | Y 55 | M 55 | C | 0 | K | 12 |
| 6-e2 | Y 40 | M 40 | C | 0 | K | 12 |
| 6-f2 | Y 25 | M 25 | C | 0 | K | 12 |
| 6-g2 | Y 10 | M 10 | C | 0 | K | 12 |
| 6-h2 | Y 5 | M 5 | C | 0 | K | 12 |
| 6-a3 | Y100 | M100 | C | 0 | K | 18 |
| 6-b3 | Y 85 | M 85 | C | 0 | K | 18 |
| 6-c3 | Y 70 | M 70 | C | 0 | K | 18 |
| 6-d3 | Y 55 | M 55 | C | 0 | K | 18 |
| 6-e3 | Y 40 | M 40 | C | 0 | K | 18 |
| 6-f3 | Y 25 | M 25 | C | 0 | K | 18 |
| 6-g3 | Y 10 | M 10 | C | 0 | K | 18 |
| 6-h3 | Y 5 | M 5 | C | 0 | K | 18 |
| 6-a4 | Y100 | M100 | C | 0 | K | 24 |
| 6-b4 | Y 85 | M 85 | C | 0 | K | 24 |
| 6-c4 | Y 70 | M 70 | C | 0 | K | 24 |
| 6-d4 | Y 55 | M 55 | C | 0 | K | 24 |
| 6-e4 | Y 40 | M 40 | C | 0 | K | 24 |
| 6-f4 | Y 25 | M 25 | C | 0 | K | 24 |
| 6-g4 | Y 10 | M 10 | C | 0 | K | 24 |
| 6-h4 | Y 5 | M 5 | C | 0 | K | 24 |
| 6-a5 | Y100 | M100 | C | 0 | K | 30 |
| 6-b5 | Y 85 | M 85 | C | 0 | K | 30 |
| 6-c5 | Y 70 | M 70 | C | 0 | K | 30 |
| 6-d5 | Y 55 | M 55 | C | 0 | K | 30 |
| 6-e5 | Y 40 | M 40 | C | 0 | K | 30 |
| 6-f5 | Y 25 | M 25 | C | 0 | K | 30 |
| 6-g5 | Y 10 | M 10 | C | 0 | K | 30 |
| 6-h5 | Y 5 | M 5 | C | 0 | K | 30 |
| 6-a6 | Y100 | M100 | C | 0 | K | 36 |
| 6-b6 | Y 85 | M 85 | C | 0 | K | 36 |
| 6-c6 | Y 70 | M 70 | C | 0 | K | 36 |
| 6-d6 | Y 55 | M 55 | C | 0 | K | 36 |
| 6-e6 | Y 40 | M 40 | C | 0 | K | 36 |
| 6-f6 | Y 25 | M 25 | C | 0 | K | 36 |
| 6-g6 | Y 10 | M 10 | C | 0 | K | 36 |
| 6-h6 | Y 5 | M 5 | C | 0 | K | 36 |
| 6-a7 | Y100 | M100 | C | 0 | K | 42 |
| 6-b7 | Y 85 | M 85 | C | 0 | K | 42 |
| 6-c7 | Y 70 | M 70 | C | 0 | K | 42 |
| 6-d7 | Y 55 | M 55 | C | 0 | K | 42 |
| 6-e7 | Y 40 | M 40 | C | 0 | K | 42 |
| 6-f7 | Y 25 | M 25 | C | 0 | K | 42 |
| 6-g7 | Y 10 | M 10 | C | 0 | K | 42 |
| 6-h7 | Y 5 | M 5 | C | 0 | K | 42 |

FIG. 4F

TRUMATCH 7-a

| | | | | | | | |
|---|---|---|---|---|---|---|---|
| 7-a | Y 100 | M 82 | C 0 | K 0 |
| 7-b | Y 85 | M 70 | C 0 | K 0 |
| 7-c | Y 70 | M 57 | C 0 | K 0 |
| 7-d | Y 55 | M 45 | C 0 | K 0 |
| 7-e | Y 40 | M 33 | C 0 | K 0 |
| 7-f | Y 25 | M 21 | C 0 | K 0 |
| 7-g | Y 10 | M 8 | C 0 | K 0 |
| 7-h | Y 5 | M 4 | C 0 | K 0 |
| 7-a1 | Y 100 | M 82 | C 0 | K 6 |
| 7-b1 | Y 85 | M 70 | C 0 | K 6 |
| 7-c1 | Y 70 | M 57 | C 0 | K 6 |
| 7-d1 | Y 55 | M 45 | C 0 | K 6 |
| 7-e1 | Y 40 | M 33 | C 0 | K 6 |
| 7-f1 | Y 25 | M 21 | C 0 | K 6 |
| 7-g1 | Y 10 | M 8 | C 0 | K 6 |
| 7-h1 | Y 5 | M 4 | C 0 | K 6 |
| 7-a2 | Y 100 | M 82 | C 0 | K 12 |
| 7-b2 | Y 85 | M 70 | C 0 | K 12 |
| 7-c2 | Y 70 | M 57 | C 0 | K 12 |
| 7-d2 | Y 55 | M 45 | C 0 | K 12 |
| 7-e2 | Y 40 | M 33 | C 0 | K 12 |
| 7-f2 | Y 25 | M 21 | C 0 | K 12 |
| 7-g2 | Y 10 | M 8 | C 0 | K 12 |
| 7-h2 | Y 5 | M 4 | C 0 | K 12 |
| 7-a3 | Y 100 | M 82 | C 0 | K 18 |
| 7-b3 | Y 85 | M 70 | C 0 | K 18 |
| 7-c3 | Y 70 | M 57 | C 0 | K 18 |
| 7-d3 | Y 55 | M 45 | C 0 | K 18 |
| 7-e3 | Y 40 | M 33 | C 0 | K 18 |
| 7-f3 | Y 25 | M 21 | C 0 | K 18 |
| 7-g3 | Y 10 | M 8 | C 0 | K 18 |
| 7-h3 | Y 5 | M 4 | C 0 | K 18 |
| 7-a4 | Y 100 | M 82 | C 0 | K 24 |
| 7-b4 | Y 85 | M 70 | C 0 | K 24 |
| 7-c4 | Y 70 | M 57 | C 0 | K 24 |
| 7-d4 | Y 55 | M 45 | C 0 | K 24 |
| 7-e4 | Y 40 | M 33 | C 0 | K 24 |
| 7-f4 | Y 25 | M 21 | C 0 | K 24 |
| 7-g4 | Y 10 | M 8 | C 0 | K 24 |
| 7-h4 | Y 5 | M 4 | C 0 | K 24 |
| 7-a5 | Y 100 | M 82 | C 0 | K 30 |
| 7-b5 | Y 85 | M 70 | C 0 | K 30 |
| 7-c5 | Y 70 | M 57 | C 0 | K 30 |
| 7-d5 | Y 55 | M 45 | C 0 | K 30 |
| 7-e5 | Y 40 | M 33 | C 0 | K 30 |
| 7-f5 | Y 25 | M 21 | C 0 | K 30 |
| 7-g5 | Y 10 | M 8 | C 0 | K 30 |
| 7-h5 | Y 5 | M 4 | C 0 | K 30 |
| 7-a6 | Y 100 | M 82 | C 0 | K 36 |
| 7-b6 | Y 85 | M 70 | C 0 | K 36 |
| 7-c6 | Y 70 | M 57 | C 0 | K 36 |
| 7-d6 | Y 55 | M 45 | C 0 | K 36 |
| 7-e6 | Y 40 | M 33 | C 0 | K 36 |
| 7-f6 | Y 25 | M 21 | C 0 | K 36 |
| 7-g6 | Y 10 | M 8 | C 0 | K 36 |
| 7-h6 | Y 5 | M 4 | C 0 | K 36 |
| 7-a7 | Y 100 | M 82 | C 0 | K 42 |
| 7-b7 | Y 85 | M 70 | C 0 | K 42 |
| 7-c7 | Y 70 | M 57 | C 0 | K 42 |
| 7-d7 | Y 55 | M 45 | C 0 | K 42 |
| 7-e7 | Y 40 | M 33 | C 0 | K 42 |
| 7-f7 | Y 25 | M 21 | C 0 | K 42 |
| 7-g7 | Y 10 | M 8 | C 0 | K 42 |
| 7-h7 | Y 5 | M 4 | C 0 | K 42 |

FIG. 4G

TRUMATCH 8-a

| | | | | | | | |
|---|---|---|---|---|---|---|---|
| 8-a | Y 100 | M 55 | C 0 | K 0 |
| 8-b | Y 85 | M 47 | C 0 | K 0 |
| 8-c | Y 70 | M 39 | C 0 | K 0 |
| 8-d | Y 55 | M 30 | C 0 | K 0 |
| 8-e | Y 40 | M 22 | C 0 | K 0 |
| 8-f | Y 25 | M 14 | C 0 | K 0 |
| 8-g | Y 10 | M 6 | C 0 | K 0 |
| 8-h | Y 5 | M 3 | C 0 | K 0 |
| 8-a1 | Y 100 | M 55 | C 0 | K 6 |
| 8-b1 | Y 85 | M 47 | C 0 | K 6 |
| 8-c1 | Y 70 | M 39 | C 0 | K 6 |
| 8-d1 | Y 55 | M 30 | C 0 | K 6 |
| 8-e1 | Y 40 | M 22 | C 0 | K 6 |
| 8-f1 | Y 25 | M 14 | C 0 | K 6 |
| 8-g1 | Y 10 | M 6 | C 0 | K 6 |
| 8-h1 | Y 5 | M 3 | C 0 | K 6 |
| 8-a2 | Y 100 | M 55 | C 0 | K 12 |
| 8-b2 | Y 85 | M 47 | C 0 | K 12 |
| 8-c2 | Y 70 | M 39 | C 0 | K 12 |
| 8-d2 | Y 55 | M 30 | C 0 | K 12 |
| 8-e2 | Y 40 | M 22 | C 0 | K 12 |
| 8-f2 | Y 25 | M 14 | C 0 | K 12 |
| 8-g2 | Y 10 | M 6 | C 0 | K 12 |
| 8-h2 | Y 5 | M 3 | C 0 | K 12 |
| 8-a3 | Y 100 | M 55 | C 0 | K 18 |
| 8-b3 | Y 85 | M 47 | C 0 | K 18 |
| 8-c3 | Y 70 | M 39 | C 0 | K 18 |
| 8-d3 | Y 55 | M 30 | C 0 | K 18 |
| 8-e3 | Y 40 | M 22 | C 0 | K 18 |
| 8-f3 | Y 25 | M 14 | C 0 | K 18 |
| 8-g3 | Y 10 | M 6 | C 0 | K 18 |
| 8-h3 | Y 5 | M 3 | C 0 | K 18 |
| 8-a4 | Y 100 | M 55 | C 0 | K 24 |
| 8-b4 | Y 85 | M 47 | C 0 | K 24 |
| 8-c4 | Y 70 | M 39 | C 0 | K 24 |
| 8-d4 | Y 55 | M 30 | C 0 | K 24 |
| 8-e4 | Y 40 | M 22 | C 0 | K 24 |
| 8-f4 | Y 25 | M 14 | C 0 | K 24 |
| 8-g4 | Y 10 | M 6 | C 0 | K 24 |
| 8-h4 | Y 5 | M 3 | C 0 | K 24 |
| 8-a5 | Y 100 | M 55 | C 0 | K 30 |
| 8-b5 | Y 85 | M 47 | C 0 | K 30 |
| 8-c5 | Y 70 | M 39 | C 0 | K 30 |
| 8-d5 | Y 55 | M 30 | C 0 | K 30 |
| 8-e5 | Y 40 | M 22 | C 0 | K 30 |
| 8-f5 | Y 25 | M 14 | C 0 | K 30 |
| 8-g5 | Y 10 | M 6 | C 0 | K 30 |
| 8-h5 | Y 5 | M 3 | C 0 | K 30 |
| 8-a6 | Y 100 | M 55 | C 0 | K 36 |
| 8-b6 | Y 85 | M 47 | C 0 | K 36 |
| 8-c6 | Y 70 | M 39 | C 0 | K 36 |
| 8-d6 | Y 55 | M 30 | C 0 | K 36 |
| 8-e6 | Y 40 | M 22 | C 0 | K 36 |
| 8-f6 | Y 25 | M 14 | C 0 | K 36 |
| 8-g6 | Y 10 | M 6 | C 0 | K 36 |
| 8-h6 | Y 5 | M 3 | C 0 | K 36 |
| 8-a7 | Y 100 | M 55 | C 0 | K 42 |
| 8-b7 | Y 85 | M 47 | C 0 | K 42 |
| 8-c7 | Y 70 | M 39 | C 0 | K 42 |
| 8-d7 | Y 55 | M 30 | C 0 | K 42 |
| 8-e7 | Y 40 | M 22 | C 0 | K 42 |
| 8-f7 | Y 25 | M 14 | C 0 | K 42 |
| 8-g7 | Y 10 | M 6 | C 0 | K 42 |
| 8-h7 | Y 5 | M 3 | C 0 | K 42 |

FIG. 4H

COLOR SELECTOR FOR FOUR-COLOR OFFSET PRINTING, AND METHOD OF CREATING IT

This invention relates to the four-color offset printing process, and more particularly to selecting colors which can be accurately reproduced by means of four-color process on offset printing equipment.

When selecting colors for printed material to be produced on a four-color offset printing press, it is common practice to refer to a color guide, or swatch book, which usually contains hundreds or even thousands of swatches illustrating different colors. Such color guides are available in the form of both swatch books and computer software. Probably the most popular of such color guides are those published by Pantone, Inc. of Moonachie, N.J.

A disadvantage presented by Pantone color guides, and others, is that many of the color swatches cannot be accurately reproduced in the four-color reproduction process. In fact, Pantone, Inc. publishes a color selector for showing the closest simulation, which can be achieved in process printing, to many of its standard colors, and many of those simulations are not very close to the standard Pantone color. This can be frustrating for a person selecting colors for printed material, since many desirable colors shown in the swatch selector guide cannot actually be produced in standard four-color process reproduction. Moreover, when certain colors are chosen from a guide, such as a Pantone color selector, and the job sent to the printer, the results are sometimes disappointing since the closest simulation which the printer is able to produce on his equipment, in the four-color process, using standard process inks, is quite far from the original color selected.

The problem of accurate color matching arises in part from the nature of the four-color offset printing process, as compared to the way that Pantone colors are created. Four-color offset printing employs three transparent inks, colored yellow, red, and blue, and black ink. The inks are laid down in the form of half-tone dots, and by varying the dot density of each of the four colors of ink, many different colors can be created in a wide variety of lighter tints and darker shades. In contrast, Pantone colors are created by physically mixing together ten different colors of opaque ink, two of those inks being black and white. Thus, there are many colors available from Pantone which cannot be reproduced using the three transparent inks plus black in the four-color, half-tone reproduction process.

It is an object of the present invention to provide a color selection guide in which every color swatch displayed is accurately reproducible by four-color process printing.

It is another object of the invention to provide such a guide wherein the colors displayed extend substantially from one end of the reproducible visible spectrum to the other.

It is a further object of the invention to provide a color selection guide which facilitates communication between the person selecting the color and the printer, so that the printer can readily understand and achieve a duplicate of the selected color; i.e., the present invention removes all guesswork and approximation from the job of printing, in four-color process, the precise colors selected by the designer of the material to be printed.

It is an additional object of the invention to provide a color selection guide, containing thousands of different colors, every one of which can be reproduced on four-color printing equipment in four-color process using standard process inks.

It is still another object of the invention to provide a method of creating a color selection guide meeting all the objectives set forth above.

Additional objects and features of the invention will be apparent from the following description in which reference is made to the accompanying charts and drawings. In the charts and drawings:

FIG. 3 shows the proportions of yellow, red, blue, and black dot densities required to reproduce a variety of colors in the greenish-blue region of the visible spectrum;

FIGS. 4A-4H shows the proportions of yellow, red, blue, and black dot densities required to reproduce lighter and darker colors at the red end of the spectrum;

FIG. 2A and 2B illustrates a page of a color selection swatch book according to the invention.

Figure 1:
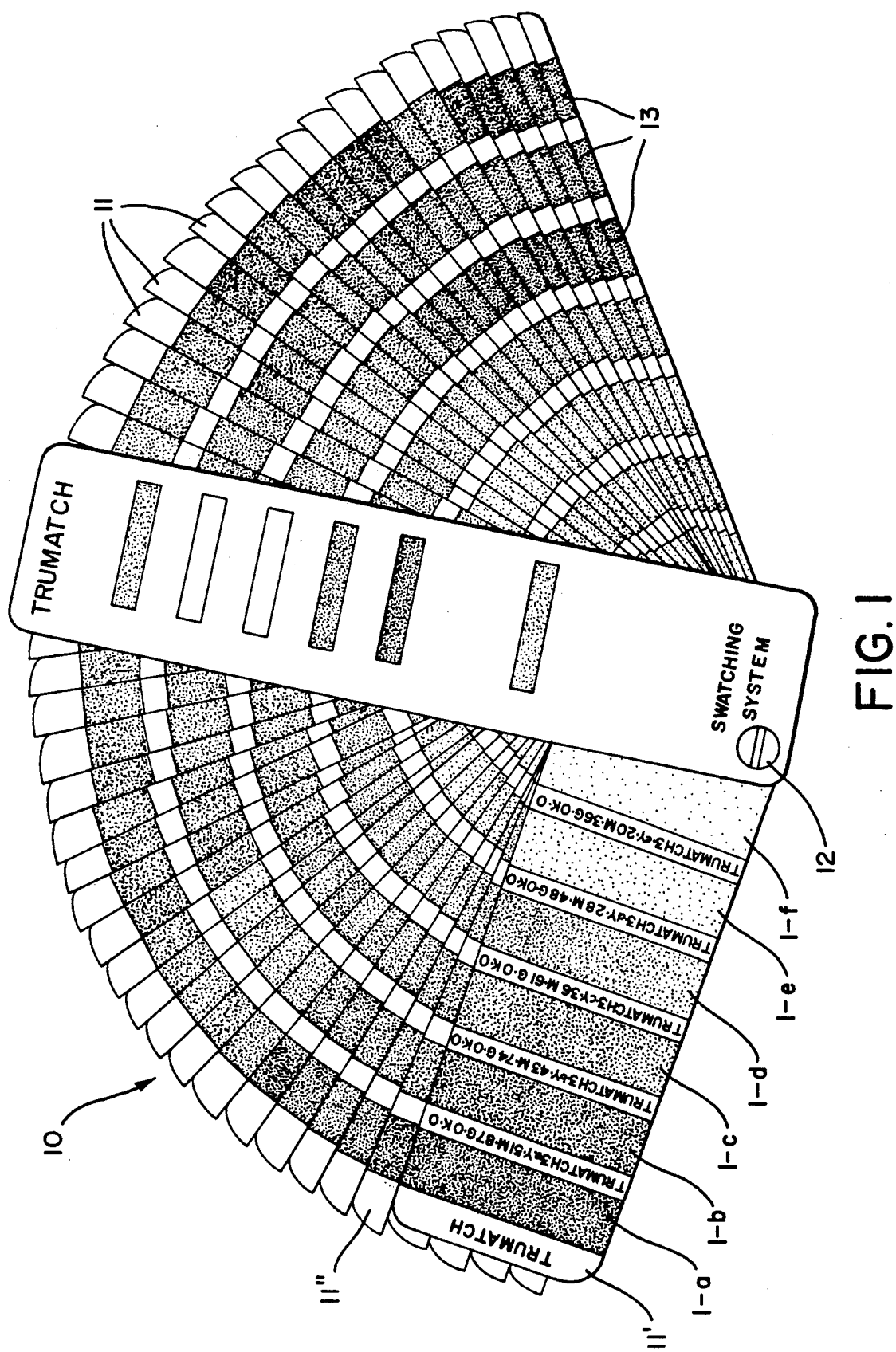
FIG. 1 illustrates a color selection guide, according to the invention, in the form of a "fan book"

At the outset, the present invention is based on dividing the visible spectrum into a plurality of distinct hues, each hue being perceptually different to the naked eye from the hues immediately preceding and succeeding it. All the distinct hues, as a group, extend substantially from one end of the spectrum, e.g., red, to the other end, e.g. violet. Moreover, all the hues are equally spaced apart, from the point of view of visual perception.

Dividing of the spectrum in this way may be accomplished in a number of different ways. Conveniently, the well-known Munsell color-order system is used. According to one aspect of the Munsell system, the visible spectrum is divided into a number of hues, the hues being separated by equal intervals of visual perception to the naked eye. Theoretically, each one of these Munsell hues could be used according to this invention, but this could result in so many different tints and shades as to be impractical and unnecessary.

Therefore, for practical convenience, it was found to be sufficient to employ between 40 and 50 equally visually spaced apart distinct hues. However, it is to be understood that other choices could be made, e.g., more or fewer hues of the Munsell system could be employed as the series of distinct hues forming the basis for the color selection system of this invention.

Many, or most, four-color offset printers use standard process inks, most frequently identified as SWOP (Specification for Web Offset Publications) inks. These standard ink colors are referred to as "yellow", "magenta" (red), "cyan" (blue), and "black", and abbreviated by the letters YMCK, respectively. By using inks having these standard SWOP colors, a printer is assured that every time a page is printed with a particular proportion of dot densities of those colors, the resulting color should always be the same.

The term "dot density" refers to the percentage of a given area on a printed page which is covered by half-tone dots of a particular ink color. Thus, for example, a yellow dot density of 50 means that 50% of a given area of a page is covered by half-tone dots of yellow ink. By varying the dot densities of the YMCK inks, a wide variety of colors can be achieved. Since the yellow, red, and blue inks are transparent, the overprinted dots of these primary colors combine to produce colors across the entire spectrum. Lighter tints are produced by reducing the dot densities of the inks, since this allows more white of the page surface to remain uncovered by ink. Darker shades are brought about by increasing the dot density of the black ink.

The manner in which printing of half-tone dots of the different colors, using color separations, or screens, i.e., thin films carrying a fine grid, is well known, and will not be described here.

Once the distinct hues have been selected, as described above using the Munsell or any other satisfactory system, the combined yellow, red, and blue dot densities required to produce each distinct hue are determined empirically (none of the distinct hues includes any black ink). Preferably this is done using the standard SWOP process ink colors. Other ink colors could be used, as long as they are clearly identified so that a printer knows to use them. In other words, different proportions of yellow, red, and blue dot densities are tested until each distinct hue is created, i.e., the proportions of those colors needed to create each distinct hue is known.

Illustrative proportions are shown in FIG. 3, which relates to a greenish-blue distinct hue around the middle of the spectrum. If the first distinct hue at the red end of the spectrum is given No. 1 and the last distinct hue at the violet end of the spectrum is given, say, No. 40, the number 25 shown in Chart I indicates a distinct color in the central region of the spectrum. FIG. 3 shows that to create distinct hue 25 (called 25-a) requires the combination of a yellow (Y) dot density of 27, a red (M) dot density of 12, and a blue (C) dot density of 89. No black ink is included, as indicated by the fact that K is zero for hue 25-a.

According to the invention, a series of lighter tints (25-b through 25-g), based on distinct hue 25-a, are created by reducing the dot densities of the Y, M, and C inks in steps. The smaller the reduction in dot densities in each step, the larger the number of steps, or tints, which result. Likewise, the greater the reduction in dot densities in each step, the smaller the number of steps, or tints, which result. It is believed most practical for the dot density of each color to be reduced in each step by about 15% of the original dot density of that color. The number 15% is used as an approximation, or goal, and is not strictly applied, since the reduction steps are rounded off to, usually, the nearest whole number, and in some cases adjustments are made for other reasons. Thus, referring to FIG. 3, the first lighter tint, 25-b has a yellow dot density of 23, a reduction of 4, or about 15% of the original yellow dot density of 27. Tint 25-b also has a red (M) dot density of 10, a reduction of 2, or about 15% (rounded off to the nearest whole number) of the original red dot density of 12, and a blue (C) dot density of 76, a reduction of 13, or about 15% of the original blue dot density of 89.

At the next step, or tint, 25-c, and the steps which follow, the dot density of each color is again reduced by the same 15% increment, i.e., yellow (Y) dot density is reduced in increments of 4, red (M) dot density is reduced in increments of 2, and blue (C) dot density is reduced in increments of 13. One exception will be noted, namely, the incremental change of red (M) dot density between tints 25-c and 25-d, which is only one percent, due to the decimal rounding. Thus, it will be seen that six lighter-and-lighter tints 25-b through 25-g have been created based on distinct hue 25-a.

Also, according to the invention, a series of darker shades, based on distinct hue 25-a, are created by adding black dot densities, in stages, to the distinct hue 25-a and the lighter-and-lighter tints 25-b through 25-g, created from it. In the present example, the black dot density is increased by six percent at each stage to create darker-and-darker shades. However, values other than six percent could be used.

Referring again to FIG. 3, shade 25-a1 has the same dot densities of Y, M, and C as distinct hue 25-a, but shade 25-a1, in addition, has six percent black (K) dot density. Similarly, shade 25-1 tracks the Y, M, and C dot densities of tint 25-b, but also has six percent black (K) dot density. In the same way, each of shades 25-c1 through 25-g1 have identical Y, M, and C dot densities to those of tints 25-c through 25-g, respectively, plus six percent black (K) dot density.

At the next stage, shades 25-a2 through 25-g2, all the Y, M, and C dot densities are identical to those of colors 25-a through 25-g, and in addition each shade includes 12% black dot density. In each of the darker-and-darker shades, the Y, M, and C dot densities, are the same as those of colors 25-a through 25-g, but at each stage the black dot density is increased by another six percent, until 42% black (K) dot density is reached at stage 25-a7 through 25-g7. Adding more black than this is considered not useful, since the colors become too dark.

FIGS. 4A-4H further illustrates the present invention by showing the creation of eight distinct hues at the red end of the spectrum, extending from the first red distinct hue 1-a through an orange distinct hue 8-a. Based on each distinct hue, e.g., 1-a, seven additional lighter-and-lighter tints, e.g., 1-b through 1-h, are created in the manner described above with reference to Chart I. Also, seven stages of darker-and-darker shades are created by adding more-and-more black dot densities in six percent increments.

FIGS. 4A-4H each distinct hue is followed by seven lighter-and-lighter tints, whereas in FIG. 3, only six lighter-and-lighter tints follow the distinct hue. The reason is that in the case of most of the distinct hues, hue 25-a being one of the exceptions, a seventh lightest tint is created by adding a last step in which the Y, M, and C dot densities are decreased by only about five percent, instead of 15%, as with the other steps.

While FIGS. 3 and 4A-4H indicate the way in which the colors of the selection guide may be created, they only illustrate the colors in numerical terms. Therefore, a color selector must be provided illustrating, in color, all the distinct hues, tints, and shades created in the manner described above. One type of color selector is shown in FIG. 1, in the form of a "fan book" 10. The fan book comprises a stack of relatively long, narrow pages 11 pivoted together at their lower ends by a connector 12, so that the pages can be "fanned out", as shown, to allow the individual pages to be viewed.

Each page 11 carries seven or eight individual color swatches 13 corresponding to groups of tints and shades found on FIGS. 3 and 4A-4H. Thus, for example, page 11' carries eight swatches 1-a through 1-h (1-g and 1-h being hidden) illustrating the colors 1-a through 1-h of FIGS. 4A-4H. The next page, 11" carries eight swatches illustrating the colors 1-a1 through 1-h1. In this way, each group of eight colors from FIGS. 4A-4H, or seven colors from FIG. 3, is found on a single page 11 of the fan book 10. Beneath each swatch, the Y, M, C, and K dot densities which make up that color are set forth. Thus, when a user of the fan book selects a color, say 25-f4, the printer immediately knows how to achieve that color, since by looking either at his own fan book, or a chart such as FIG. 3, he is informed that dot densities of Y-7-, M-3, C-22, and K-24 are needed to print that color.

Figure 2A:
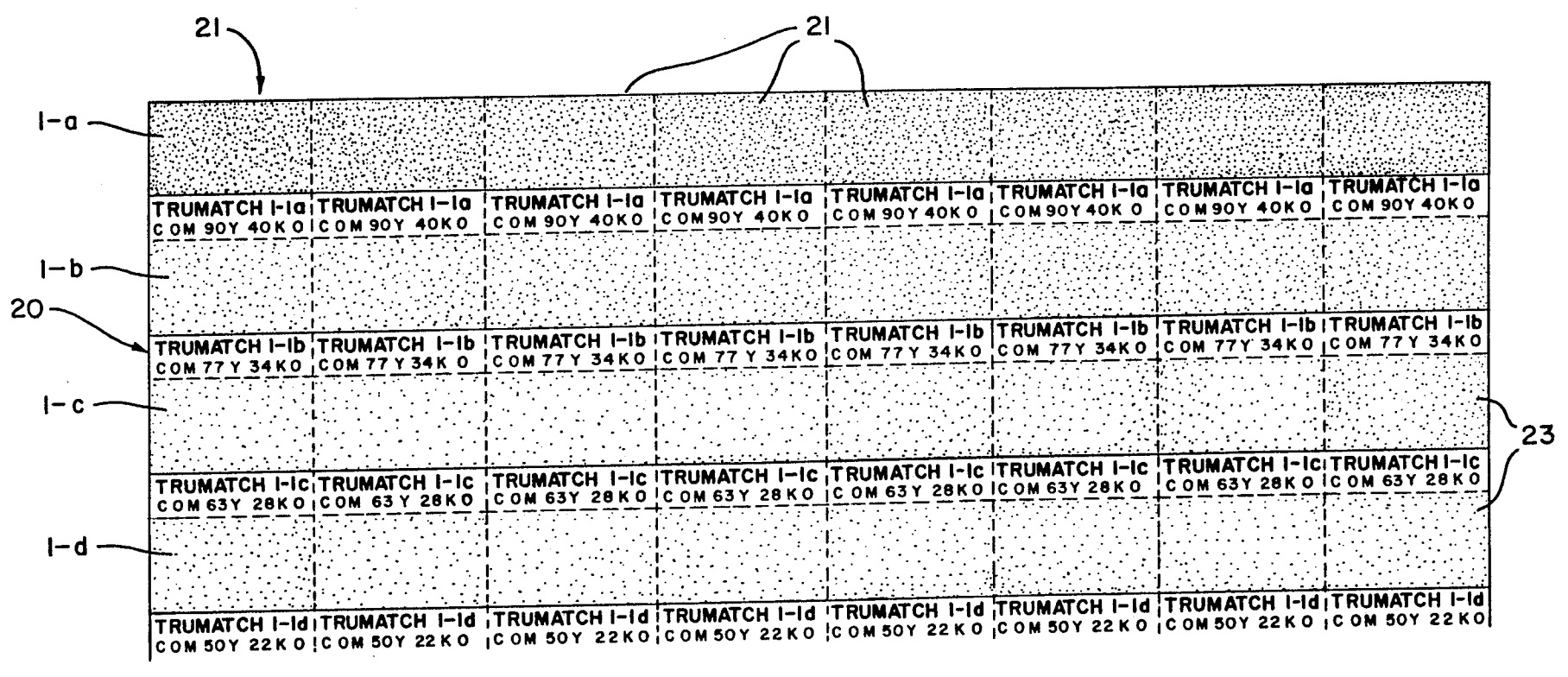
Figure 2B:
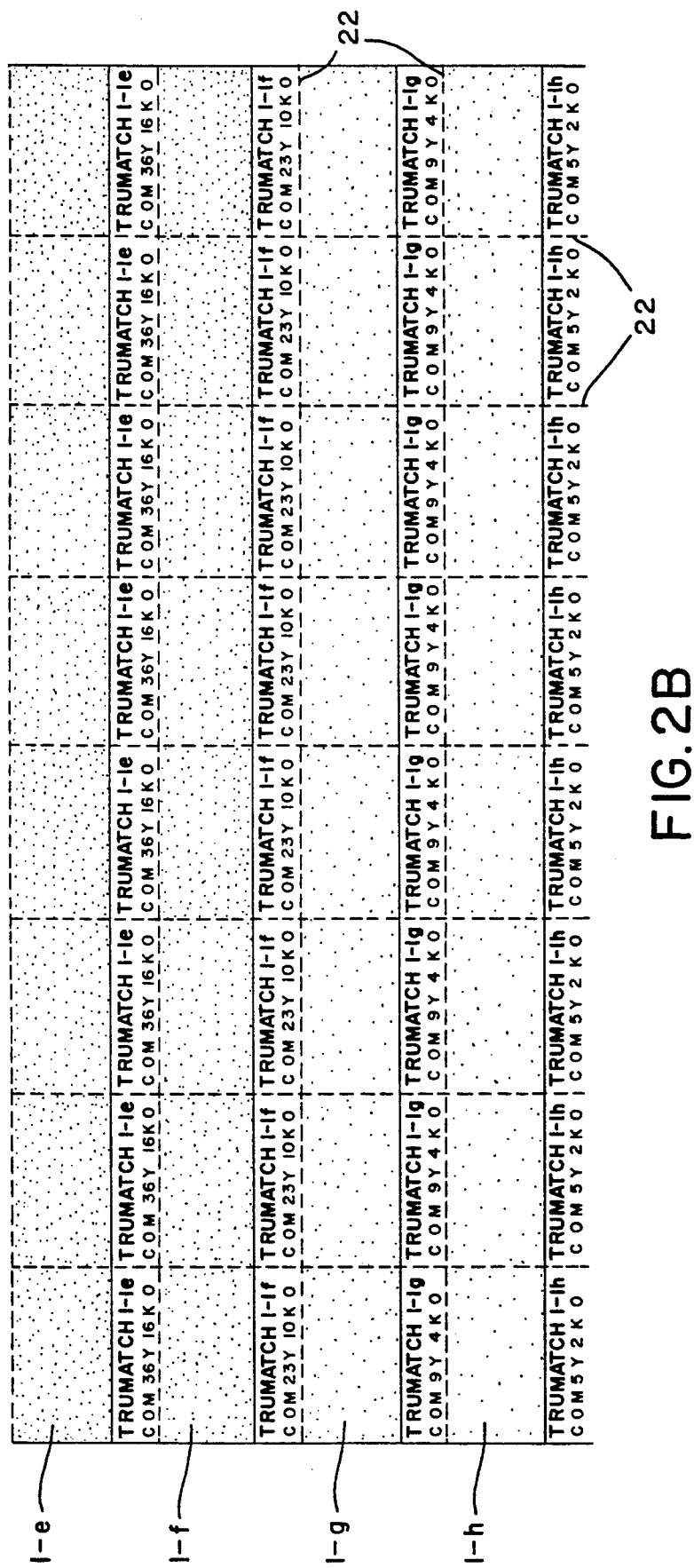

FIG. 2 shows another type of selector guide in the form of a typical page 20 of a swatch book having removable color swatches. Each page 20 corresponds to each page 11 of the fan book of FIG. 1. More specifically, the swatches in each column 21 correspond to the swatches on page 11' of the fan book. The columns 21 are all duplicates of each other, and page 20 has a grid of perforations 22, so that individual swatches 23 can be torn form the page and attached to the artwork to be printed. This permits additional communication with the printer so as to give the printer a visual guide as to the color selected. Each swatch also carries the Y, M, C, and K dot densities needed to reproduce the color. Since there are eight columns 21, each page 20 carries eight duplicates of each color.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A method of creating a multiplicity of color swatches for use in selecting colors for four-color offset printing, comprising the steps of:
   (a) dividing the visible spectrum into a plurality of distinct hues, each hue being perceptually different to the naked eye from the hues immediately preceding and succeeding it,
   (b) determining the proportion of yellow, red, and blue dot density needed to create color swatches of each of those distinct hues,
   (c) for each distinct hue, reducing each of the yellow, red, and blue dot density in steps, the percentage of reduction in each step being the same for each of the yellow, red, and blue dot density, to create lighter-and-lighter tint swatches,
   (d) adding a particular proportion of black dot density to each distinct hue and all the stepped lighter tints created from it to produce a series of darker shade swatches,
   (e) adding greater proportions of black dot density in stages to all the stepped lighter tints crated from each distinct hue to produce darker-and-darker shade swatches of each tint, the proportion of black dot density added to each tint at each stage being the same, and
   (f) preparing individual color swatches bearing each of said hues, tints, and shades.

2. A method as defined in claim 1 wherein the percentage reductions of yellow, red, and blue dot density from step-to-step are approximately equal for most of the steps.

3. A method as defined in claim 2 wherein the yellow, red, and blue dot densities are reduced in increments of about 15%, of the original dot density for that color, at each step.

4. A method as defined in claim 1 wherein the increased proportions of black dot density added at each stage are equal.

5. A method as defined in claim 4 wherein the black dot density is increased in 6% increments from stage-to-stage.

6. A method as defined in claim 1 wherein the visible spectrum is divided into about 40 to 50 distinct hues.

7. A method as defined in claim 1 wherein the stepwise reduction of yellow, red, and blue dot density in each distinct hue swatch produces about seven different tint swatches in addition to the distinct hue swatch.

8. A method as defined in claim 1 wherein the black dot density is increased in about seven stages to produce about 64 shade swatches for each of the distinct hue swatches.

9. A color swatch arrangement for use in selecting colors for four-color offset printing, comprising:
   (a) a plurality of distinct hue swatches extending from one end of the visible spectrum to the other, the hue of each swatch being perceptually different to the naked eye from the hues of the swatches immediately preceding and succeeding it, and each hue swatch being a combination of certain proportions of yellow, red, and blue dot density,
   (b) a series of lighter-and-lighter tint swatches associated with each distinct hue swatch, the tint swatches being produced by reducing each of the yellow, red, and blue dot density in steps, the percentage of reduction in each step being the same for each of the yellow, red, and blue dot density,
   (c) a series of darker shades swatches produced by adding a particular proportion of black dot density to each distinct hue and all the stepped lighter tints created from it, and
   (d) a series of darker-and-darker shade swatches produced by adding greater proportions of black dot density in stages to all the stepped lighter tints created from each distinct hue, the proportion of black dot density added to each tint at each stage being the same.

10. A color swatch arrangement as defined in claim 1 wherein the percentage reductions of yellow, red, and blue dot density from step-to-step are approximately equal for most of the steps.

11. A color swatch arrangement as defined in claim 10 wherein the yellow, red, and blue dot densities are reduced in increments of about 15%, of the original dot density for that hue, at each step.

12. A color swatch arrangement as defined in claim 9 wherein the increased proportions of black dot density added at each stage are equal.

13. A color swatch arrangement as defined in claim 12 wherein the black dot density is increased in 6% increments from stage-to-stage.

14. A color swatch arrangement as defined in claim 9 wherein there are about 40 to 45 distinct hue swatches.

15. A color swatch arrangement as defined in claim 9 wherein the stepwise reduction of yellow, red, and blue dot density in each distinct hue swatch produces about seven different tint swatches in addition to the distinct hue swatch.

16. A color arrangement as defined in claim 9 wherein the black dot density is increased in about seven stages to produce about 64 shade swatches for each of the distinct hue swatches.

* * * * *